Figure 1:
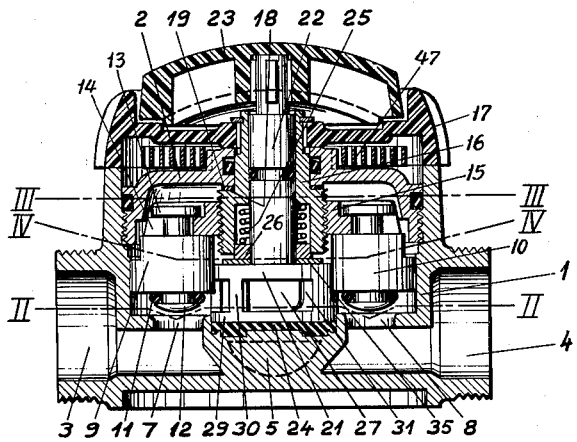

Oct. 3, 1961     I. KATVA     3,002,531
MIXING VALVES

Filed Jan. 2, 1959                               2 Sheets-Sheet 1

INVENTOR
Ilmari Katva

BY
Watson, Cole, Grindle & Watson
ATTORNEYS

Oct. 3, 1961     I. KATVA     3,002,531
MIXING VALVES

Filed Jan. 2, 1959     2 Sheets-Sheet 2

INVENTOR
Ilmari Katva

BY
Watson, Cole, Grindle & Watson
ATTORNEYS

United States Patent Office 3,002,531
Patented Oct. 3, 1961

3,002,531
MIXING VALVES
Ilmari Katva, Hillerod, Denmark, assignor to Poul Robert Broen, Copenhagen, Denmark
Filed Jan. 2, 1959, Ser. No. 784,770
Claims priority, application Denmark Jan. 9, 1958
12 Claims. (Cl. 137—597)

This invention relates to a mixing valve for hot and cold water or water and steam having two inlets and at least one outlet and having a valve body arranged in each inlet, said valve bodies being operable by means of a common operating member, the mixing valve further comprising a rotatable plug constructed with a gate.

In a known valve of this type, the valve bodies are operated by means of a cam which is constructed in such a manner that rotation of the cam will cause one or the other valve body or both to be lifted from their seats. The plug which is independent of the valve bodies is used for directing the quantity of liquid admitted by the valve bodies from a mixing chamber located after the valve bodies in the direction of flow selectively to a shower or to a bath tub. Thus, when the cam is operated, the mixing proportion is changed, and for each value of the mixing proportion there will be a definite rate of flow corresponding thereto. In other words, the rate of flow cannot be controlled independently of the mixing proportion.

It is the object of the invention to construct a mixing valve of the aforesaid type by means of which it is possible by operation of the valve to obtain a continuously increasing rate of flow that does not substantially influence the mixing proportion, and also to obtain a continuous variation of the mixing proportion that does not substantially influence the rate of flow. It should be mentioned at this point that a mixing valve is known, by means of which it is possible to control the rate of flow and the mixing proportion independently of one another, but in this known valve the two inlets of the valve housing are directly connected to a cock device, and following the latter, as viewed in the direction of flow, a single valve is mounted in a single outlet from the valve housing. Valves of this known type have the drawback that to prevent undesirable flow in the valve from one inlet to the other, it is necessary to provide non-return valves in the inlets or in the pipes connected thereto.

According to the invention, each valve body is constructed as a slide having part of its surface engaged with the portion of the surface of said plug in which said gate is provided. By this arrangement there is obtained a direct interaction between the valve bodies and the plug in that the valve bodies, when being displaced relative to the plug, will change the passage areas uncovered by the gate of the plug and, conversely, the plug when being rotated will change the passage areas uncovered by the valve bodies. In this manner a mixing proportion adjusted by means of the plug will remain substantially unchanged notwithstanding movement of the valve bodies to change the rate of flow and, conversely, rotation of the plug will result in a change of the mixing proportion without substantially influencing the rate of flow adjusted by means of the valve bodies.

In order to obtain a variation of the mixing proportion which is substantially proportional to the angle of rotation of the plug, the longitudinal edges of the gate of the plug may be rounded in such a manner as to provide a gradual transition to the outer surface of the plug. By this arrangement, as will be described in further detail hereinafter, a compensation is obtained for the sudden drop of pressure which would otherwise occur in the initiating phase of the opening of the passage area of the plug.

In such cases where the mixing valve has two outlets the gate may preferably extend along about 180° of the circumference of the plug. In this manner an advantageous symmetrical construction of the mixing valve can be obtained because the valve bodies may be arranged diametrically opposite to one another with respect to the plug.

In order to obtain change-over from one outlet to the other, the gate of the plug may communicate with a port provided in a portion of the plug which is rotatable in a portion of the valve housing constructed with two outlets.

To exclude the possibility of stopping the flow of liquid from the valve housing by operation of the plug, whereby there would be a risk of medium flowing from one of the inlets through the mixing valve to the other inlet, the width of said port, as measured along the circumference of the plug, is preferably greater than the distance between the two outlets likewise measured along the circumference of the plug.

The invention will now be described in further detail with reference to the accompanying drawing, in which FIGURE 1 shows a vertical section through one form of a mixing valve according to the invention, FIGURE 2 a section along the line II—II in FIGURE 1, FIGURE 3 a section along the line III—III in FIGURE 1, FIGURE 4 a section along the line IV—IV in FIGURE 1, FIGURE 5 a section similar to that shown in FIGURE 4, but through a valve having one outlet only, and FIGURE 6 the plug of the mixing valve in side elevation with parts in section.

In the drawing, 1 is a valve housing provided at its top with a cover 2. The valve housing as illustrated in FIGURES 1-4 has two inlets 3 and 4 and two outlets 5 and 6. The latter may e.g. be connected to a shower and to a bath tub respectively. It is observed, however, that the invention is not limited to mixing valves with two outlets, but may with equal advantage be used for mixing valves with a single outlet, see FIGURE 5, or with three or more outlets.

Each of the inlets 3 and 4 is terminated by an annular seat 7 and 8 respectively. These seats cooperate with valve bodies 9 and 10 respectively. A sealing ring of circular cross section, in the following referred to as O-ring 11, is carried by each valve body 9 and 10 and is received in a circumferential groove below the bottom face of the respective valve body. When the valve is closed, the bottom faces of the valve bodies are pressed against the metal surface in the bottom of valve bores in the housing accommodating the valve body, the said metal surfaces serving as abutment to limit axial movement of the valve bodies in a direction towards the seats 7 and 8. Thus, the O-ring is only subjected to a radial compression determined by the relative values of the inner diameter of the seat and the bottom diameter of the groove receiving the O-ring. In this manner a predetermined and constant pressure is obtained, which is so selected as to obtain optimum conditions for a long lifetime of the O-ring while at the same time obtaining an optimum sealing effect. The said pressure is quite independent of the force at which the mixing valve is closed by turning of the operating knob 17. The elasticity of the O-ring and the inlet pressure will cooperate will cooperate to keep the rings in sealing contact with the seats and at the same time with the bottom faces of the valve bodies.

At the side of the O-ring remote from the valve body a projecting portion 12, in the following referred to as head, is provided. The outer diameter of these heads is only slightly less than the inner diameter of the seats 7, 8. Thus, in the closed position of the valve there will only be a narrow interspace left between the head and the vertical wall of the seat bore. This determines the grain size of impurities that may be carried along by the incoming medium and may deposit between the O-ring and the seat. When these particles are small, the O-ring will not suffer injury to the same extent as would otherwise be the case. Consequently, the heads 12 have a protecting effect towards the O-rings. In order to obtain optimum conditions of the throttling effect in the valve seats, the heads are preferably more or less spherical in shape.

Each valve body 9, 10 is constructed at its top with a neck formed with an outwardly extending flange 13. Each neck is received in the forked end 14 of a yoke 15 provided at its center with a threaded hole which is engaged by a threaded hollow spindle 16 carrying an operating knob 17 at its upper end.

Upon rotation of the knob 17 the valve bodies 9 and 10 are simultaneously moved by means of the yoke relative to the seats 7 and 8 and at right angles to the planes of the latter.

During rotation of the knob 17, the hollow spindle 16 is held against axial movement relative to the valve housing by means of a shoulder 18 of the spindle, which engages below a slide ring 19 abutting an edge of the cover 2.

A plug 21 is rotatably mounted in a cylindrical bore 20 of the valve housing, said bore being constructed with diametrically opposite lateral openings. The plug 21 is provided with a spindle 22, which is rotatably mounted in the hollow spindle 16 and carries an upper knob 23 at its top. The plug is kept pressed against a sealing washer 24 by means of a spring 25 which is inserted between a guide ring 26 of the spindle 22 and a shoulder in the hollow spindle 16. The guide ring 26 guides the spindle 16 relative to the inner spindle 22 at its lower end.

The plug 21 is cylindrical and is constructed in its circumferential surface with a gate 27 which is cut into the plug from one side and extends approximately to the diametrical plane of the plug. In the part of the plug below the said gate there is provided a downwardly extending semicircular port 28, the inner contour of which coincides with the inner wall of the gate 27, while said port 28 is outwardly confined by a narrow curved edge portion 29. To reinforce this edge portion it is connected at its middle point with the portion of the plug above the gate 27 by means of a rib 30. The edges 31 between the rear wall of the gate 27 and the cylindrical surface of the plug are rounded, see FIGURE 2.

Figure 4:
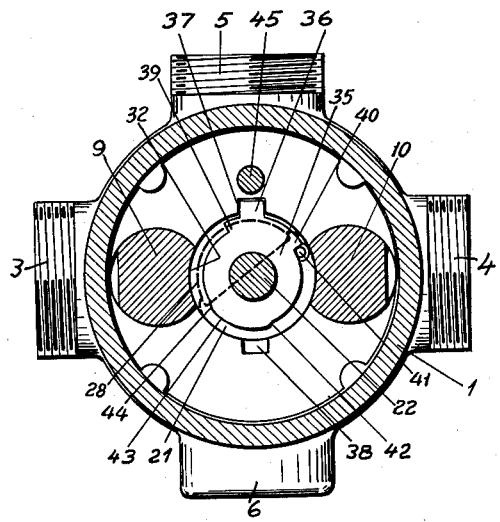
Figure 5:
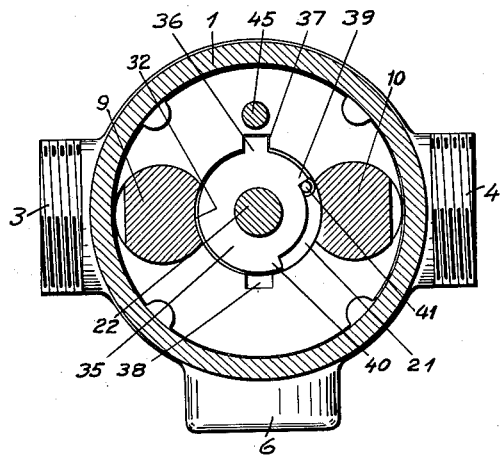
Figure 6:
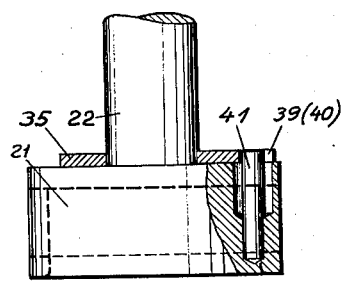

In the embodiment shown, the valve bodies 9 and 10 are cylindrical along the major part of their circumference, and the circumference is completed by a concave cylindrical surface 32, FIGURES 4 and 5, the curvature of which corresponds to the curvature of the cylindrical surface of the plug.

The convex cylindrical portions of the valve bodies are slidable in individual bores of the valve housing, said bores being formed as laterally and upwardly open cylinders, the lateral openings having the same width as the concave portion of the valve bodies and registering with a lateral opening of the cylindrical bore 20, in which the plug is mounted. Thus, the concave portions of the valve bodies will slidably engage the plug through the lateral openings of the bore 20.

In the embodiment shown in FIGURES 1–4, the sealing washer 24 provided in the bore 20 has two approximately triangular holes 33 and 34, which respectively communicate with two outlets 5 and 6 through passages in the valve housing. The curved outer edges of the holes 33 and 34 have the same radial distance from the center line of the plug as the inner side of the edge portion 29 of the plug, and the holes 33 and 34 are located diametrically opposite and with their inner corners at a short distance from the center of the plug. As will be seen from FIGURE 2, the width of the port 28 as measured at the bottom face of the plug along the inner side of the edge portion 29 is greater than the distance between the holes 33 and 34 likewise measured in the circumferential direction so that the port 28 will always overlap at least one of the holes in any position. The discharge from the valve can therefore not be stopped by the plug whereby any possibility of intrusion of fluid from one inlet to the other is excluded.

Figure 2:
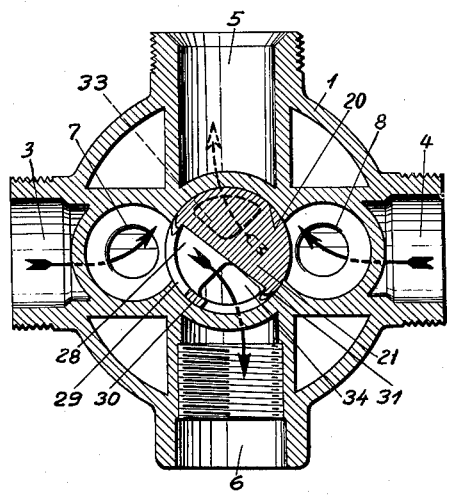
Figure 3:
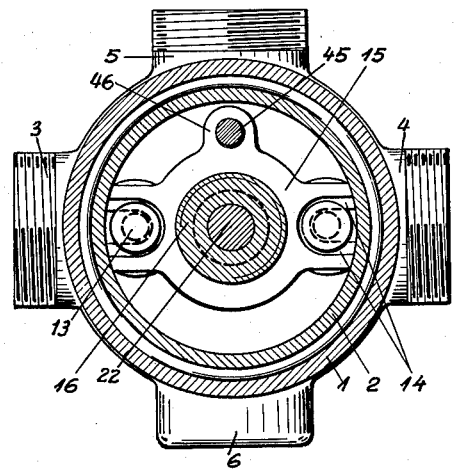

In the position of the plug shown in FIGURE 2, medium from the inlet 3 is permitted—supposing the valve bodies 9 and 10 to be lifted from their seats—to flow past the seat 7 and through the lateral openings of the bore receiving the valve body 9 into the gate 27 of the plug and through the port 28 and the hole 34 to the outlet 6 as indicated in FIGURE 2 by the downwardly turned arrow. When the plug is turned in the anti-clockwise direction as seen in FIGURE 2, a flow will also be established from the inlet 4 to the outlet 6, because the right-hand rounded edge 31 uncovers part of the lateral opening of the bore receiving the valve body 10. When the plug has been turned about 60° in the anti-clockwise direction from the position shown in FIGURE 2, the flow from the inlet 3 will be interrupted while the flow path from the inlet 4 is still open. During the whole of this movement the triangular hole 34 is entirely free so that the movement of the plug relative to the said hole does not affect the flow. Turning of the plug as described results in a change of the mixing proportion, because the edges 31 will respectively close and open the lateral openings towards the valve bodies, and, as a consequence of the rounding of the edges 31 of the plug, this change of the mixing proportion is approximately proportional to the angle of rotation of the plug. In the initial stage of the opening of a lateral opening, the passage area will increase slowly, viz. in proportion to the amount of removal of the rounded edge 31 from the edge of the lateral opening in question. Hereby a compensation is obtained for the relatively high sudden drop of pressure that would occur if the uncovered area were proportional to the angle of rotation of the plug in the initial phase of the opening movement. On the other hand, the position of the plug will not change the rate of flow during the rotation. The rate of flow is controlled by the axial displacement of the valve bodies 9 and 10. Each of these controls the inflow from the inlets 3 and 4 in three ways, seeing that both the O-rings 11, the projections 12 and the bottom edges of the concave portions 32 of the valve bodies serve to control the rate of flow. In the first stage of the opening movement, the O-rings 11 and the projection 12 bring about a throttling effect over the valve seats, while the bottom edges of the concave portions of the valve bodies will function in the same manner as a slide, seeing that the area of the lateral openings towards the plug uncovered by rotation of the spindle will vary in proportion to the displacement of the valve bodies.

From FIGURE 2 it will be seen that switching over from the outlet 6 to the outlet 5 takes place very easily by rotating the plug 180° whereby the hole 34 is covered and the hole 33 is uncovered.

In order to enable the user to get an indication as to the position assumed by the plug, the valve is provided with a locking mechanism consisting of a locking plate 35, which is mounted between the guide ring 26 and the top face of the plug. This locking plate has a projection 36, which engages in one of two recesses 37 and 38 in the valve housing, and is thereby kept immovable when the plug is turned. The locking plate shown in FIGURE 4 is intended for use in a valve with two outlets and is provided with two abutments 39 and 40 which cooperate with a pin 41. As illustrated in FIGURE 6, the latter is mounted in a counter-sunk hole of the upper side of the plug, so that the upper end of the pin can yield a little in the outward direction.

In the position shown in FIGURE 4, the pin 41 strikes the abutment 40 and the plug now assumes the position corresponding to full uncovering of the lateral opening towards the valve body 9 and to discharge through the outlet 5. When the plug is now turned in the clockwise direction, the said lateral opening is covered and the opposite lateral opening from the valve body 10 is uncovered, until the pin 41 engages a shoulder 42 of the locking plate when the lateral opening towards the valve body 10 is fully uncovered. On continued turning of the plug in the clockwise direction, the pin 41 is elastically bent a little outwards by a cam 43 of the locking plate, whereby the user's attention is drawn to the fact that a change-over is taking place from the outlet 5 to the outlet 6. This change-over is completed when the pin reaches a further shoulder 44 and returns to its original position. When the pin reaches the shoulder 44, the lateral opening towards the valve body 9 is fully closed, but upon continued turning of the plug in the clockwise direction, the lateral opening towards the valve body 9 is uncovered while the lateral opening towards the valve body 10 is closed, until the abutment 39 is reached. No further turning of the plug in the clockwise direction is hereafter possible. The illustrated arrangement of the projection 36 in the recess 37 is to be employed when the inlet 3 is supplied with a warm medium and the inlet 4 with a cold medium, because the abutments 39 and 40 will then prevent the user from performing the switchover through the "hot" range.

If it is desired to connect the inlet 4 to the warm medium and the inlet 3 to the cold medium, the locking plate 35 is arranged with the projection 36 engaged in the recess 38.

The embodiment of the mixing valve shown in FIGURE 5 has only one outlet 6, and accordingly the locking plate 35 has two abutments 39 and 40 for limiting the movement of the plug.

To prevent the valve bodies 9 and 10 from jamming in their bores during the rotation of the hollow spindle 16 in the yoke 15, the latter is non-rotatably, but slidably held in the valve housing by means of a guide pin 45 which is fixed in the top of the valve housing 1 and extends through a hole in a projection 46 of the yoke.

In the embodiment illustrated in FIGURE 1, a spiral spring 47 is inserted between the knob 17 and the cover 2, the inner end of said spring being attached to the cover and the outer end being attached to the knob so that the latter will automatically be returned to the position in which the valves 9 and 10 are closed, when the mixing valve is not in use.

I claim:

1. A mixing valve for hot and cold water or water and steam having two inlets and at least one outlet and having a valve body arranged in each inlet, said valve bodies being operable in unison by means of a common operating member, said mixing valve further comprising a rotatable cylindrical plug having a port in its circumferential surface, characterized in that each valve body is constructed as a slide having part of its surface engaged with the portion of the circumferential surface of said plug in which said port is provided.

2. A mixing valve as in claim 1, in which the longitudinal edges of the port of the plug are rounded in such a manner as to provide a gradual transition to the outer surface of the plug.

3. A mixing valve as in claim 1, in which the port extends along about 180° of the circumference of the plug.

4. A mixing valve as in claim 3, in which the port is interrupted by a rib.

5. A mixing valve as in claim 3, in which the port in the circumferential surface of the plug communicates with a second port provided in a portion of the plug which is rotatable in a portion of the valve housing constructed with two outlets.

6. A mixing valve as in claim 5, in which the width of said second port, as measured along the circumference of the plug, is greater than the distance between the two outlets likewise measured along the circumference of the plug.

7. A mixing valve as in claim 1, in which said valve bodies are coupled together by means of a yoke having forked ends engaging a neck portion of one and the other of said valve bodies respectively, said yoke having a central threaded bore engaged by a screw threaded spindle carrying said operating member.

8. A mixing valve as in claim 7, in which said spindle is hollow to accommodate an inner spindle for operating said plug.

9. A mixing valve as in claim 7, in which said yoke is guided in said valve housing by means of a guide pin.

10. A mixing valve as in claim 1, in which the bottom surfaces of said valve bodies engage, in the closed position of the valve, with the metal surfaces of the bottoms of the corresponding valve bores, and a head is provided centrally of the bottom surface of each valve body and is connected therewith through a narrow neck portion, said head having an outer diameter only slightly less than the inner diameter of the valve seats, a sealing ring being provided around each of said neck portions.

11. A mixing valve as in claim 1, in which the cross section of each valve body is shaped as a circle with a lenticular cut-away portion.

12. A mixing valve as in claim 1, in which a coiled spring is inserted between the operating member of the valve bodies and the valve housing.

References Cited in the file of this patent

UNITED STATES PATENTS

| 2,563,955 | Pearse | Aug. 14, 1951 |
| 2,823,697 | Picard | Feb. 18, 1958 |
| 2,855,001 | Horne | Oct. 7, 1958 |
| 2,887,128 | Bloomberg | May 19, 1959 |